United States Patent
Boehm et al.

(10) Patent No.: US 7,299,461 B2
(45) Date of Patent: Nov. 20, 2007

(54) EXPANSION SYNTAX

(75) Inventors: Fritz A. Boehm, Dripping Springs, TX (US); Terence M. Potter, Austin, TX (US); James S. Blomgren, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 559 days.

(21) Appl. No.: 10/738,281

(22) Filed: Dec. 16, 2003

(65) Prior Publication Data

US 2004/0139423 A1   Jul. 15, 2004

Related U.S. Application Data

(60) Provisional application No. 60/433,803, filed on Dec. 16, 2002.

(51) Int. Cl.
*G06F 9/45*   (2006.01)
(52) U.S. Cl. ..................................... 717/143
(58) Field of Classification Search ............... 717/112, 717/149–159, 143; 711/207, 219; 703/14; 345/531; 716/17, 18
See application file for complete search history.

(56) References Cited

U.S. PATENT DOCUMENTS 6,289,497 B1 * 9/2001 Leight et al. .................. 716/17

OTHER PUBLICATIONS

Christopher Bachmann, 'A Hardware Testbed for Distributed Heterogeneous Adaptive Computing', Center for Parallel and Distributed Computing, Technical Report No. CPDC-TR-9905-007, May 1999, pp. 1-64.*

* cited by examiner

*Primary Examiner*—Tuan A Vu
(74) *Attorney, Agent, or Firm*—Matthew J Booth & Associates PLLC; Matthew J Booth

(57) ABSTRACT

An expansion syntax that creates a set of expressions in software code is disclosed. The syntax includes one or more expansion constructs embedded within a software code expression, interpreted by an expansion function to create a set of expanded expressions. Each construct includes an expansion syntax indicator and a plurality of list parameters, which may be start, end, step, and skip integers, or strings of non-white space. Both constructs may include either default or expressly assigned list names, which serve as iterators during the expansion process. Each expanded expression created includes a list member from each embedded construct. The expansion methodology, and the resulting set of expanded expressions, depends upon the number of unique iterators present in the software code expression and whether any of the embedded constructs include the stride parameter.

6 Claims, 2 Drawing Sheets

EXPANSION SYNTAX

CROSS REFERENCE TO RELATED APPLICATIONS

This application claims the benefits of the earlier filed U.S. Provisional Application Serial No. 60/433,803, filed 16 Dec. 2002 (16.12.2002), which is incorporated by reference for all purposes into this specification.

BACKGROUND OF THE INVENTION

1. Field Of The Invention

The present invention relates to syntactical rules for software code. More particularly, the present invention adds a high level construct that creates lists and sets of expanded expressions to the syntactical rules for software code, including object-oriented computer languages such as the "C" software language and the N-NARY C hardware design language originally disclosed in the HDL Patent.

2. Description Of The Related Art

N-Nary logic, also known as NDL logic, is a new dynamic logic family developed by Intrinsity Inc. (f/k/a EVSX Inc.), the Assignee of this application. Intrinsity's N-Nary-related technology is trademarked under the name FAST14, and circuits implemented in N-nary logic are denoted as "NDL gates" "NDL circuits" and "NDL designs", all implemented in "FAST14 technology." N-Nary logic and the N-Nary design style are described in U.S. Pat. No. 6,066,965, entitled "Method and Apparatus for a N-Nary logic Circuit Using 1-of-4 Signals", which is incorporated herein for all purposes and is hereinafter referred to as the "NDL Patent."

Supporting a new logic design style required the invention of new design support techniques and tools to facilitate the computer-aided design and analysis of logic circuits and their constituent subcircuits. Some of these new design support techniques and tools, including a new hardware design language, are disclosed in U.S. Pat. No. 6,289,497, entitled "Method and Apparatus for N-NARY Hardware Description Language" (the "HDL Patent"), and U.S. Pat. No. 6,367,065, entitled "Method and Apparatus for N-NARY Logic Circuit Design Tool with Precharge Circuit Evaluation" and U.S. Pat. No. 6,345,381, entitled "Method and Apparatus for a Logic Circuit Design Tool" (the "Design Tools Patents"). The HDL Patent and the Design Tools Patents are owned by Intrinsity, Inc., and all three patents are incorporated by reference for all purposes into this specification.

The HDL Patent and the Design Tools Patents disclose and claim a computer-aided design methodology and tool, and an associated hardware description language similar to "C" that is suitable for use by designers employing the NDL logic design style. As described in the HDL Patent and Design Tools Patents, a designer developing an NDL circuit produces a syntax statement encoded in a combination of ANSI C and the N-nary C language disclosed in the HDL Patent. The syntax statement comprises one or more "gate instantiations," wherein each gate instantiation contains information regarding the inputs, outputs, and logical function of a gate in the circuit under design. Each gate instantiation includes one or more gate output signal variables, one or more gate operators, and one or more gate expressions. The syntax statement describes both the logical function implemented by the logic circuit being designed and the specific configuration of transistors required to build said circuit. As described in detail in the Design Tools Patents, the design tool compiles the syntax statement and generates both a behavioral model, which is a software-implemented simulation of the logic circuit under design, and a schematic, which is a physical description of the logic circuit under design.

As described in the HDL and Design Tools Patents, each gate expression is explicitly written to enable the design tool to automatically create a circuit having the specifically desired transistor arrangement without much or any further work by a human. The drawback to this approach is that usually, a large number of gate expressions must be written to represent a high-level circuit or logical function. Oftentimes, similar gate expressions are repeated, with only a slight variation of the signal names used in each gate. Writing more equations makes the design more difficult to comprehend and more prone to subtle errors.

The present invention solves this problem by adding constructs governed by specific syntactical rules to the HDL language. The new constructs, collectively designated the "expansion syntax", are interpreted to expand a single expression into one or more explicit N-Nary C code expressions. The expansion syntax supports specifying high-level constructs in the N-Nary C language, while still maintaining the requirement that each gate be explicitly described in a gate instantiation written in N-Nary C code. Specifying gates using a higher-level construct that is automatically expanded makes the design easier to comprehend and less prone to subtle errors.

While the present invention was developed as a solution to reduce the need for developers to write multiple, nearly-identical gate expressions, and thereby reduce the potential for error, Applicants immediately recognized the applicability of the present invention to any computer language. For example, software designers writing programs in higher-order code must often declare lists of variables, objects, or other named elements, often with only subtle or minor differences in the names of the listed items. Applicants have used the present invention to write gate expressions for NDL circuits as described above, to declare signals and buses in test programs written for simulation, functional verification, or built-in-test programs, in simulation monitors such as that disclosed in U.S. Pat. No. 6,594,803 assigned to Intrinsity, Inc., and in other software programs and applications that require lists of named elements or sets of similar expressions, as indicated by the examples herein.

SUMMARY OF THE INVENTION

The present invention is an expansion syntax that creates a set of expressions in software code. The expansion syntax includes one or more expansion constructs embedded within a software code expression, wherein each expansion construct includes an expansion syntax indicator and a plurality of list parameters. In some embodiments, the expansion syntax indicator is a pair of square brackets that enclose the list parameters. In one construct, the list parameters include a start integer and an end integer, and may also include a step parameter that is either a default value of 1 or a positive, nonzero integer, and a skip parameter that is either a default value of 0 or a positive integer.

If step is at its default value, this construct expands into a list of ordered integers. If step has a value greater than 1, this construct expands into a list of ordered integer pairs wherein the difference between the first and second integer of the pair is (step−1). In either case, the increment or decrement amount between the first integer in each list member is equal to the product of step and (skip+1).

In another construct, the list parameters are strings of non-white space characters. Both constructs may include either default or expressly assigned list names, which serve as iterators during the expansion process.

The present invention includes an expansion function that interprets software code expressions that include expansion constructs to create a set of expanded expressions. Each expanded expression in the set of expanded expressions created includes a member of each list specified by each of the expansion constructs included in the software code expression. For software expressions that contain one or more expansion constructs but only one unique iterator, the expansion function creates a set of expanded expressions with a set size equal to the number of list members in each list identified by the expansion constructs and named by the unique iterator. For software expressions that contain expansion constructs having more than one unique iterator, the expansion function creates a set of expanded expressions with a set size equal to the cross product of the list sizes associated with each iterator.

Finally, some expansion constructs may include both a name that comprises an iterator and a stride parameter, which is an integer greater than 1. The stride parameter defines how many expansion iterations must occur before the next member of the list associated with expansion construct that includes the stride parameter is included in an expanded expression. A list that includes a stride parameter wraps back to the first element when the last element is used.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus for a software construct that is interpreted by an expansion function to create a list of items in a software program, according to certain syntactical rules. This disclosure describes numerous specific details that include pseudocode fragments, example variable lists that may include NDL signal names, and other aspects showing Applicant's specific uses of the present invention to provide a thorough understanding of the present invention. One skilled in the art will appreciate that the applications, uses, and languages described herein are exemplary only and do not limit the use or applicability of the present invention in any way. Those skilled in the art will understand that one may practice the present invention without these specific details, and in other contexts, using other software languages, applications, and approaches.

Figure 1:
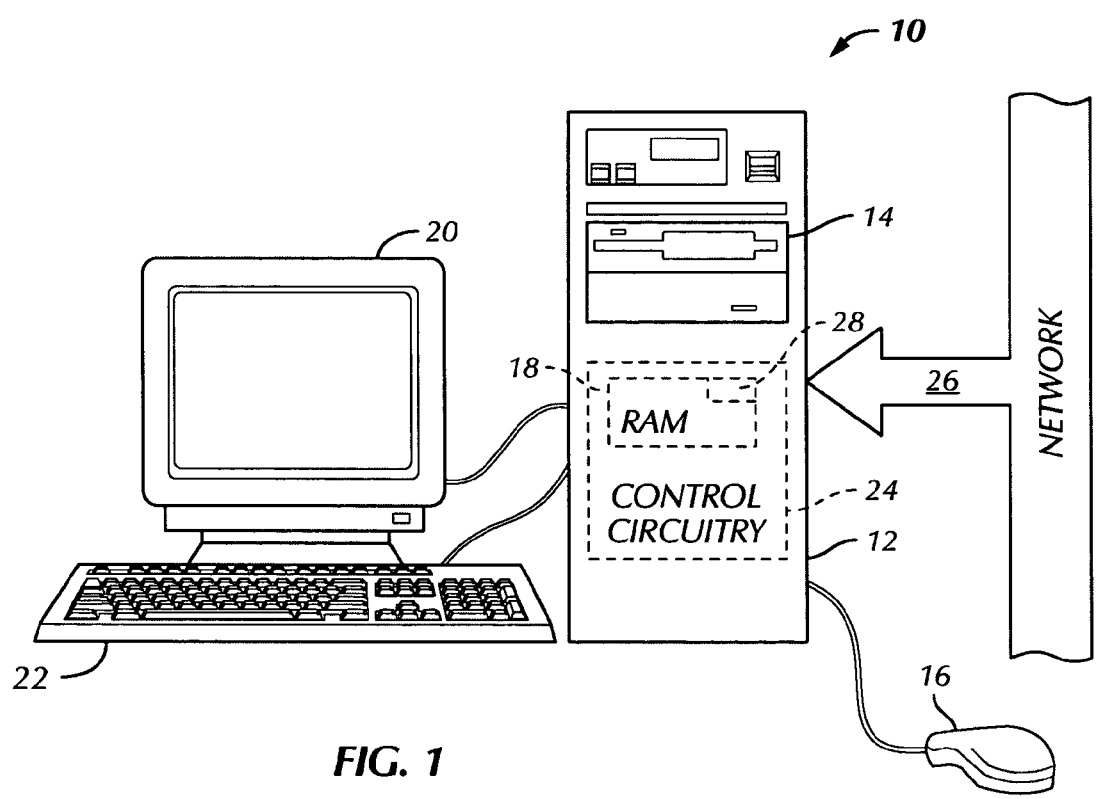
FIG. 1 shows a standard computer workstation of the type commonly used and suitable for hardware and software design, simulation, verification, and other activities.

FIG. 1 shows a standard computer workstation 10 of the type commonly used and suitable for hardware and software design, simulation, verification, and other activities. The computer workstation 10 shown in FIG. 1 is suitable for practicing the present invention discussed herein, and may also incorporate software programs that utilize the present invention. Those skilled in the art will understand that software programs that incorporate the present invention may also be used in any of a number of platforms, including but not limited to handheld devices such as personal data assistants, communications devices, servers, mainframes, embedded systems, laptops, and consumer electronics.

As shown in FIG. 1, the workstation 10 comprises a monitor 20 and keyboard 22, a processing unit 12, and various peripheral interface devices that might include removable media local storage 14 and a mouse 16. Processing unit 12 further includes internal memory 18, and internal storage (not shown in FIG. 1) such as a hard drive.

Workstation 10 interfaces with digital control circuitry 24 and executable software 28 that may include, for example, device design and layout software if the computer workstation 10 is functioning as a device design and layout workstation. In the preferred embodiment shown in FIG. 1, digital control circuitry 24 is a general-purpose computer including a central processing unit, RAM, and auxiliary memory. Both the executable software 28 and the digital control circuitry 24 are shown in FIG. 1 as residing within processing unit 12 of workstation 10, but both components could be located in whole or in part elsewhere, and interface with workstation 10 over connection 26 or via removable media local storage 14. As shown in FIG. 1, connection 26 could be a connection to a network of computers or other workstations, which could also be connected to printers, external storage, additional computing resources, and other network peripherals. One skilled in the art will recognize that the present invention can be practiced upon any of the well known specific physical configurations of standalone or networked design workstations.

The operator interfaces with digital control circuitry 24 and the software 28 via the keyboard 22 and/or the mouse 16. Control circuitry 24 is capable of providing output information to the monitor 20, the network interface 26, and a printer (not shown in FIG. 1).

As described above, Applicants' design source code often requires repetition of similar gate equations with only a slight variation of the signal names used in each gate. The expansion syntax of the present invention was developed to create a method to describe gate equations in as concise a way as possible. The present invention enables gates to be described using a small amount of relatively complex information, which is then automatically expanded into a large amount of relatively simple information. The present invention makes complex gates easier to understand, and eliminates the potential for cut-and-paste errors when entering in logic gates that are similar.

Two basic construct embodiments of the expansion syntax of the present invention are disclosed herein, denoted as the "expansion list" and the "explicit list." Both constructs provide a method for creating lists in software code. As described herein, the constructs can be embedded in logic expressions, which are then expanded according to specific syntactical rules to automatically create groups of related or similar expressions, thus avoiding tedious, error-prone, repetitive entry of virtually identical expressions in software source code.

Figure 2:
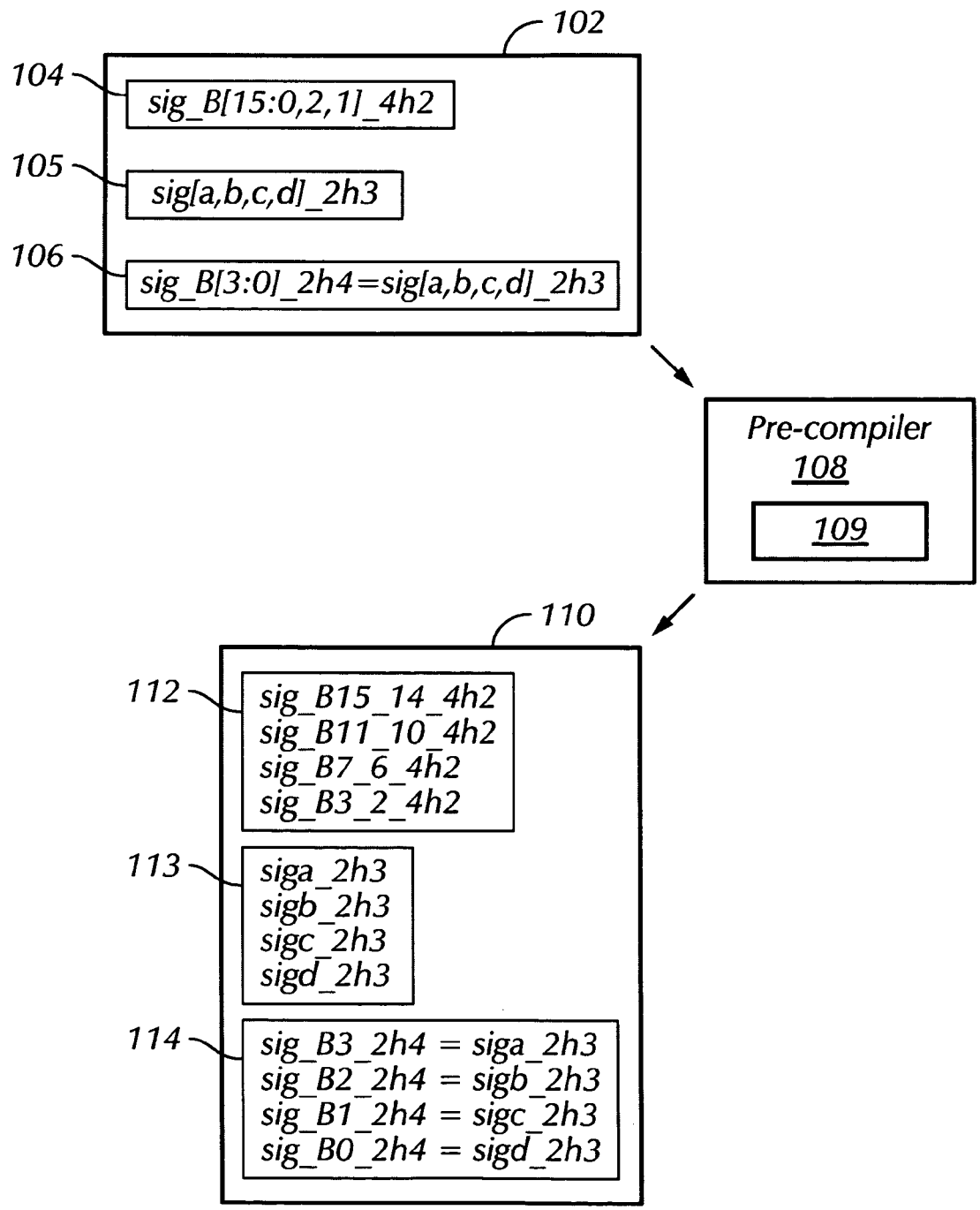
FIG. 2 is a conceptual block diagram showing a computer program that includes an expansion list construct, an explicit list construct, and a logical expression that includes embedded constructs, according to one embodiment of the present invention.

FIG. 2 is a conceptual block diagram 100 showing an expansion list construct 104, an explicit list construct 105, and a logical expression that includes embedded constructs 106 within a computer program 102. A pre-compiler 108 includes a software expansion function 109 that interprets the constructs 104, 105, and 106 according to the expansion syntax to create expanded expression sets 112, 113, and 114 within source code program 110. As explained in further detail below, the expansion list construct 104 is used to specify a set containing an ordered list of numbers that may be either single integers or integer pairs, either of which may be embedded in other code as shown in FIG. 2 at 112. The explicit list construct 105 is used to specify a list containing string elements, which, again, is shown embedded into a set of software statements 113. Both construct types are shown embedded in logic expression 106, which is then expanded by the software expansion function 109 according to the expansion syntax to produce groups of logic expressions 114. Those skilled in the art will understand that while the software expansion function 109 is shown as resident within a pre-compiler 108, the software expansion function 109 could reside at any convenient location and can be applied to computer program 102 to expand constructs 104, 105, and 106 at any convenient time up to and including compilation.

As shown in the examples presented below, each embodiment of the constructs of the present invention includes at least an expansion syntax indicator and a plurality of list parameters. In the expansion list embodiment disclosed, the expansion syntax indicator is a set of square brackets that enclose a colon. In the explicit list embodiment, the expansion syntax indicator is a set of square brackets without a colon. The list parameters for each construct are further described below.

Expansion List Syntax

The expansion list construct syntax is as follows:

[start:end,step,skip]

In one embodiment, all expansion list syntax list parameters (start, end, step, and skip) are nonnegative integers. The basic operation of the construct is described below in the context of this embodiment, followed by a discussion of other embodiments that use negative integers and other types of variables for the start and end list parameters.

In an embodiment where all expansion list syntax parameters are nonnegative integers, the start and end parameters are mandatory and must be either a positive integer or 0. The step and skip parameters are optional. If a step parameter is included, it must be a positive integer and cannot be 0. If the step list parameter is excluded, then the expansion syntax for the expansion list construct assumes that step=1. If the skip parameter is included, it must be a positive integer or 0. If it is excluded, then the expansion syntax for the expansion list construct assumes that skip=0. Note that start does not have to be a greater integer than end.

The expansion list construct creates an ordered set or list of numbers beginning with the integer start and ending on or before the integer end. If no step is specified, then each list member is simply an integer between start and end, inclusive. In a preferred embodiment, if a step is specified, then each set member has the form "x_y", where the difference between x and y is (step−1). Those skilled in the art will understand that when a step parameter is specified, the specific format of set members created when the construct B expanded is a matter of design choice and other formats may be utilized without departing from the present invention.

If a skip is specified, skip is the number of members in the list to leave out between steps. If the default values for step and skip are used (1 and 0, respectively), then an ordered list of integers from start to end is created. Following is a pseudo code example of the algorithm used for generating lists using the expansion syntax for the expansion list construct:

```
for (e = start; e <= end; e += step * (skip + 1))
{
    if (skip)
        element = "e_(e+skip)";
    else
        element = "e";
}
```

Following are some examples of the uses of the expansion list construct of the present invention in an embodiment wherein all list parameters are nonnegative integers, along with the ordered integer lists and expanded expressions that each construct produces.

EXAMPLE 1 sig_B[15:0]__2h2;

In this example, the expansion list construct is embedded in an N-Nary signal name that might be included in a logic expression or other portion of the N-Nary design source code. The construct list parameters start and end are 15 and 0, respectively. No step or skip is specified, so the default values of 1 and 0, respectively, are used and the list member format will be simple integers. This construct expands to a list of 16 integers, (|start-end|+1=16), each of which appears in the proper location in the signal name. Accordingly, the expression in Example 1 creates an expanded expression set of 16 different expressions, each of which contains one integer list member.

sig_B15__2h2
    sig_B14__2h2
    sig_B13__2h2
    sig_B12__2h2
    sig_B11__2h2
    sig_B10__2h2
    sig_B9__2h2
    sig_B8__2h2
    sig_B7__2h2
    sig_B6__2h2
    sig_B5__2h2
    sig_B4__2h2
    sig_B3__2h2
    sig_B2__2h2
    sig_B1__2h2
    sig_B0__2h2

The order of the set can be reversed by having start=0 and end=15, as follows.

EXAMPLE 2 sig_B[0:15]__2h2

This expression, containing the embedded construct [0:15], expands to a list of the following signals:

sig_B0__2h2
    sig_B1__2h2
    sig_B2__2h2
    sig_B3__2h2
    sig_B4__2h2
    sig_B5__2h2
    sig_B6__2h2
    sig_B7__2h2
    sig_B8__2h2
    sig_B9__2h2
    sig_B10__2h2 sig_B11__2h2
sig_B12__2h2
sig_B13__2h2
sig_B14__2h2
sig_B15__2h2

Consider the same construct, except now including a step of 2:

EXAMPLE 3 sig_B[15:0,2]__4h2

This example expands to a set of 8 items (|15−0+1|/2=8, in the following order:

sig_B15__14__4g2
sig_B13__12__4g2
sig_B11__10__4g2
sig_B9__8__4g2
sig_B7__6__4g2
sig_B5__4__4g2
sig_B3__2__4g2
sig_B1__0__4g2

Note that each expanded expression includes a set member from the construct in the form "x_y", where the difference between x and y is 1: (step−1). Following is another example, where the step is 3:

EXAMPLE 4 sig_B[17:0,3]__4h2

This example expands to a expanded expression set of 6 items (|17−0|+1)/3=6, in the following order:

sig_B17__15__4h2
sig_B14__12__4h2
sig_B11__9__4g2
sig_B8__6__4g2
sig_B5__3__4g2
sig_B2__0__4g2

Finally, the construct embedded within the expression in the following example includes a step of 2 and a skip of 1:

EXAMPLE 5 sig_B[15:0,2,1]__4h2

The Example 5 equation expands to a set of 4 items ((|15−0|+1)/2)/(step * skip=2)=4, listed in the following order:

sig_B15__14__4h2
sig_B11__10__4h2
sig_B7__6__4h2
sig_B3__2__4h2

As these examples demonstrate, the sets created by the constructs are always ordered, meaning that the integers embedded in the resulting expressions will always appear in either ascending or descending order, depending upon the start and end list parameters specified in the expansion list construct. On an ascending list, the first integer in each list member will be incremented from the first integer in the prior list member by an amount equal to the product of step and (skip+1). On a descending list, the first integer in each list member will be decremented by the same amount.

After reading this specification or practicing the present invention, those skilled in the art will recognize that the start and end list parameters are not limited to nonnegative integers. In fact, the start and end list parameters can define a list or set range for any obvious or implied list. For example, if an expanded set of ordered negative integers is desired, the start and end parameters can be negative integers. If a set of letters in the order of the English alphabet is desired, the start and end list parameters can be the start and end letters that define the set range. An expansion list construct for an ordered set of letters might be as follows:

EXAMPLE 6

[A:J].

This construct would expand to the following ordered set:

A
B
C
D
E
F
G
H
I
J

Step and skip parameters can also be used with these types of start and end parameters, as follows:

EXAMPLE 6

[A:J,1,2].

A
C
E
G
I

Other examples might include a list of the elements in the order that they appear on the periodic table or a list of prime numbers in order. If these types of implied lists are used, the expansion function must include a definition of the contents and order of the list specified in the expansion notation so that the list will expand correctly.

Explicit List Syntax

The explicit list syntax is as follows:

[elementa, elementb, elementc . . . ]

As described above and shown in the examples below, the expansion syntax indicator for the explicit list construct is square brackets without an enclosed colon. In the explicit list syntax, all list parameters (elementa, elementb, elementc, and so on) are strings composed of nonwhite space characters (no blanks, tabs, or new lines allowed) and separated by commas. Accordingly, lists of one element must be named to avoid confusion between the expansion syntax and array indexing. Naming lists is discussed in further detail below, but in general, practitioners of the present invention should avoid lists of one element. Following is an example of the explicit list syntax:

EXAMPLE 7

[1,1,2,3,5,8]

This construct expands to the following list of 6 items:

1
1
2
3
5
8

Count

The count parameter is an optional parameter usable in either the expansion list construct or the explicit list construct. If used, count is a nonnegative integer having a default value of 1. The count parameter appears as an integer to the immediate left of the expansion syntax indicator in the constructs. If construct includes a count parameter, the expansion function repeats the entire list specified by the construct the number of times specified by count. In other words, the number of list members created from constructs that include count equals the product of the count and the number of list parameters.

EXAMPLE 8

2[A, A, B, C, E, H]

Example 8 is an explicit list construct that has a count of 2. Accordingly, this construct expands to the following list of 12 items (2*6 list parameters)

A
A
B
C
E
H
A
A
B
C
E
H

An expansion list construct or an explicit list construct may also be list parameters in other constructs. The order of expansion is similar to the order of operations rules applicable to nested parenthetical expressions in mathmatics: nested expressions are expanded first, their expanded sets are substituted into place, then the next-outer construct is expanded, that list substituted in, and so forth.

EXAMPLE 9

[2[X,Y,Z],[3:0], [0:4]]

This construct, which is an explicit list construct that includes three nested constructs as list parameters (an explicit list construct with a count of 2 and two expansion list constructs), expands into the following set of ordered members:

X
Y
Z
X
Y
Z
3
2
1
0
0
1
2
3
4

Expansion list constructs and explicit list constructs can both be utilized in a single statement or expression in a software program, as shown in the examples below. However, using multiple constructs in a single expression involves additional expansion syntax rules to insure that the desired set of expanded expressions is generated. These rules include using named lists, iterators, and an expansion rule denoted herein as stride. These rules are explained below.

Naming Lists

Both the expansion list construct and explicit list construct provide a way to name the list that results when the constructs are expanded. In addition, naming is useful when distinguishing iteration requirements in expanding multiple-construct statements. Iterators and the use of named lists in iteration are described in further detail below.

Names are put between '#' characters as the first argument to lists, either in expansion list or explicit list notation. When no name is specified in a particular construct, as in examples 1-9 above, a default name is assigned to the resulting list, where the default name is a string that reflects the numerical size of the list. Accordingly, the default name of each of the lists that result from the constructs shown in Examples 1 and 2 above is "16"; the default name for the list that results from the Example 4 construct is "6", and the default name for the list that results from the Example 8 construct is "12". Examples of assigned names are provided below:

EXAMPLE 10 sig_B[#unique_name#15:0]_2h2 has a name of "unique_name"

EXAMPLE 11

[#explicit_list_name#1,1,2,3,5,8] has a name of "explicit_list_name"

Iterators

Once an equation containing one or more constructs has been parsed by the software expansion function and all of its lists have been identified, there are two basic methods to expand the constructs into the required lists. One method applies where all of the lists identified in an expression have identical names. The other method applies where two or more distinct list names are present in a single expression. Each unique list name is considered to be an iterator. There is no limit on the number of iterators allowed in an expression or on the size of each iterator.

When there is only one iterator in an expression, the equation(s) are expanded out by embedding the first member of each list of expansion syntax in the proper place relative to the non-expansion syntax of the expression. Next, the second member of each list is embedded into the proper place relative to the non-expansion syntax of the expression, then the third, and so on, until the lists are empty. If all lists in an expression are not the same size, an error message is generated. This might occur, for example, if two constructs having the same explicitly assigned name, but whose list parameters specify two different sized lists, appear in the same expression. This would not occur if default names were used, because the default names for two differently-sized lists would be different strings, and therefore the expression would have two different iterators. Examples of the one-iterator expansion method are provided below:

EXAMPLE 12 sig_B[7:0]_2h2=sig_B[7:0]_2h1;

In this expression, both lists have the same name ("8"), so the expression has only one iterator. The two lists specified are of the same size (8), so the following 8 expanded expressions are generated:

sig_B7__2h2=sig_B7__2h1;

sig_B6__2h2=sig_B6__2h1;

sig_B5__2h2=sig_B5__2h1;

sig_B4__2h2=sig_B4__2h1;

sig_B3__2h2=sig_B3__2h1;

sig_B2__2h2=sig_B2__2h1;

sig_B1__2h2=sig_B1__2h1;

sig_B0__2h2=sig_B0__2h1;

EXAMPLE 13 sig_B[#some_name#7:0,2]__4g4=sig_B[#some_name#22, 15,8,1]__4g3;

In Example 13, both lists have the same name, "some_name", so the expression has only one iterator. The lists have the same size (4), so 4 expanded expressions are generated.

sig_B7__6__4h4=sig_B22__4h3;

sig_B5__4__4h4=sig_B15__4h3;

sig_B3__2__4h4=sig_B8__4h3;

sig_B1__0__4h4=sig_B1__4h3;

EXAMPLE 14 sig_B[3:0]__2h4=sig[a,b,c,d]__2h3;

In Example 14, both lists have the same name, "4", so the expression has only one iterator. Even though one is an expansion list and the other is an explicit list, the lists specified have the same size (4), so the following 4 expanded expressions are generated:

sig_B3__2h4=siga__2h3;

sig_B2__2h4=sigb__2h3;

sig_B1__2h4=sigc__2h3;

sig_B0__2h4=sigd__2h3;

If two or more lists specified in expansion syntax appear in an expression where at least two of the identified lists have a unique name, then there are multiple iterators present and the expansion method described above does not apply. This is true regardless of how many instances of a single list are included. In other words, if an expression includes three instances of a list named, by default, "4" and one instance of a 6-element list explicitly named "unique_name", the expression is considered to have two iterators. Multiple-iterator equations expand into a set of equations where the number of equations equals the cross product of the sizes of the iterators. In the 4-list, 2-iterator example described in the text above, the expansion syntax would create a set of 24 equations (4×6). Any number of iterators of any size can be chained together. The examples below show the expansion of two-iterator equations to provide cases that are reasonable to understand.

EXAMPLE 15 sig[a,b]__4h[4:1=sig[c,d]__4h[3:0];

The equation in Example 15 includes four lists, but only two unique list names, and therefore, two iterators. The first iterator has the name "2", the default name for the two lists identified in the explicit list constructs. The second iterator has the name "4", the default name for two lists specified in the expansion list constructs. The expansion syntax expands this expression into 8 equations, which is the cross product of the list sizes of the two unique iterators: 4*2=8. The equations created by the expansion syntax are as follows:

siga__4h4=sigc__4h3;

siga__4h3=sigc__4h2;

siga__4h2=sigc__4h1;

siga__4h1=sigc__4h0;

sigb__4h4=sigd__4h3;

sigb__4h3=sigd__4h2;

sigb__4h2=sigd__4h1;

sigb__4h1=sigd__4h0;

If an expression contains multiple lists having the same size, but expansion into a cross product of equations is desired, it is necessary to name the lists using unique names to create a multiple-iterator expression and avoid expansion using the single-iterator method. Consider the example below

EXAMPLE 16 sig[a,b]_B[1:0]__2h2=sig[c,d]_B1:0]__2h1;

In this example, all lists have the default name "2". As this equation stands, it is a single-iterator expression and, using the single-iterator method, 2 expanded expressions would be generated:

siga_B1__2h2=sigc_B1__2h1;

sigb_B0__2h2=sigd_B0__2h1;

If a cross product is desired, two of the lists must be expressly named to create another iterator and invoke the multiple-iterator expansion method:

EXAMPLE 17 sig[a,b]_B[#different#1:0]__2h2=sig[c,d]_B[#different#1:0]__2h1;

Example 17 is the same expression as that shown in Example 16, except that there are now two iterators in the expression. The first iterator, corresponding to the default name of the two lists specified by the two explicit list constructs, is "2". The second iterator corresponds to the name of the two lists specified by the two expansion list constructs: "different". The list size associated with each unique iterator is 2, so the cross product is 4, and four expanded expressions are generated:

siga_B1__2h2=sigc_B1__2h1;

sigb_B1__2h2=sigd_B1__2h1;

siga_B0_2h2=sigc_B0_2h1;

sigb_B0_2h2=sigd_B0_2h1;

Stride

The final concept within the expansion syntax of the present invention is stride. Stride is an optional expansion iteration parameter within the expansion constructs that enables iterators of different sizes to be grouped together by incorporating incrementing and wrapping rules. In other words, stride enables two lists of different sizes to be specified in the same expression using the same name. This means that the two differently-sized lists will have the same iterator, which would generate an error absent the stride parameter. The size of the list that includes the stride parameter is ignored when determining the number of expanded equations that are generated. Instead, the list that includes the stride parameter is subject to special incrementation and wrapping rules during expansion.

Software designers use stride to specify how the iterators are incremented during the expansion process. A stride is a positive, nonzero integer specified after the explicit list name in an expansion list construct, before the closing '#' character. The stride associated with a list defines how many expansion iterations must occur before the next element in the list is selected. The default stride is 1. A list that includes a non-default stride wraps back to the first element when the last element is used.

EXAMPLE 18 sigB[1:0]_[#a#7:0]_2h2=sigA[1:0]_[#a,2#3:0]_2h1;

In Example 18, there are two different iterators. The first iterator is the default list name "2" associated with the sigB and sigA expansion lists. The second iterator is the list name "a" associated with the 8-member list that appears as the second list in the expression (on the left of the equality), but also with 4-member list that appears on the right of the equality. The 4-member list "a" has a stride of 2, signaling the invocation of incrementing and wrapping rules. A stride of 2 tells the interpretation function to move to the next item in the list every second time the list is examined during the expansion process to find the next iterator.

The above expression generates the following set of expanded expressions:

sigB1_7_2h2=sigA1_3_2h1;

sigB1_6_2h2=sigA1_3_2h1;

sigB1_5_2h2=sigA1_2_2h1;

sigB1_4_2h2=sigA1_2_2h1;

sigB1_3_2h2=sigA1_1_2h1;

sigB1_2_2h2=sigA1_1_2h1;

sigB1_1_2h2=sigA1_0_2h1;

sigB1_0_2h2=sigA1_0_2h1;

sigB0_7_2h2=sigA0_3_2h1;

sigB0_6_2h2=sigA0_3_2h1;

sigB0_5_2h2=sigA0_2_2h1;

sigB0_4_2h2=sigA0_2_2h1;

sigB0_3_2h2=sigA0_1_2h1;

sigB0_2_2h2=sigA0_1_2h1;

sigB0_1_2h2=sigA0_0_2h1;

sigB0_0_2h2=sigA0_0_2h1;

In sum, the present invention is an expansion syntax that creates a set of expressions in software code. The expansion syntax includes one or more expansion constructs embedded within a software code expression, wherein each expansion construct includes an expansion syntax indicator and a plurality of list parameters. In one construct, the list parameters include a start integer and an end integer, and may also include a step parameter that is either a default value of 1 or a positive, nonzero integer, and a skip parameter that is either a default value of 0 or a positive integer. This construct expands into a list of ordered integers wherein the increment or decrement amount between the first integer of each list member is equal to the product of step and (skip+1).

In another construct, the list parameters are strings of nonwhite space characters. Both constructs may include either default or expressly assigned list names, which serve as iterators during the expansion process.

The present invention includes an expansion function that interprets software code expressions that include expansion constructs to create a set of expanded expressions. Each expanded expression in the set of expanded expressions created includes a member of each list specified by each of the expansion constructs included in the software code expression. The expansion methodology, and the resulting set of expanded expressions, depends upon the number of unique iterators present in the software code expression and whether any of the embedded constructs include the stride parameter.

Other embodiments of the invention will be apparent to those skilled in the art after considering this specification or practicing the disclosed invention. The specification and examples above are exemplary only, with the true scope of the invention being indicated by the following claims.

We claim the following invention:

1. A method to create an expansion syntax for semiconductor design software that allows a single complex software code expression that represents multiple logic gates to be expanded into one or more simple software code expressions that individually represent a single logic gate, comprising:
    embedding a list construct within a software code expression wherein said list construct includes an expansion syntax indicator comprising a pair of brackets enclosing a plurality of list parameters wherein said list parameters identify list members and wherein said list members comprise ordered integers within the range of integers identified by a start integer, an end integer, and optionally a count integer, a step integer and or a skip integer to indicate a count of integers to step or skip during expansion, wherein said list construct further comprises one or more iterators used as an operator acting upon a parameter list to expand the list members, and wherein the list is grouped as a default list name or a explicit list name;
    interpreting said list construct within said software code expression according to one of said iterator and said list member expansion syntax using an expansion function; and expanding using said expansion function said list construct within said software code expression to create a set of expanded expressions, said expanding further comprising:
- where one of said software code expressions contains only one unique iterator, said one code expression is expanded as the list size associated with said one unique iterator; or
- where said software code expression contains more than one unique iterator, said one code expression is expanded as the cross product of the list sizes associated with each unique iterator;

wherein the cross product is defined according to the relationships between the skip and stride definitions of said iterators, if any, or as a full cross product otherwise.

2. The claim according to claim 1 wherein said list construct further comprises an expansion list construct and or an explicit list construct.

3. A method to use an expansion syntax for semiconductor design software that allows a single complex software code expression that represents multiple logic gates to be expanded into one or more simple software code expressions that individually represent a single logic gate, comprising:

embedding a list construct within a software code expression wherein said list construct includes an expansion syntax indicator comprising a pair of brackets enclosing a plurality of list parameters wherein said list parameters identify list members and wherein said list members comprise ordered integers within the range of integers identified by a start integer, an end integer, and optionally a count integer, a step integer and or a skip integer to indicate a count of integers to step or skip during expansion, wherein said list construct further comprises one or more iterators used as an operator acting upon a parameter list to expand the list members, and wherein the list is grouped as a default list name or a explicit list name;

interpreting said list construct within said software code expression according to one of said iterator and said list member expansion syntax using an expansion function; and expanding using said expansion function said list construct within said software code expression to create a set of expanded expressions; said expanding further comprising:
- where one of said software code expressions contains only one unique iterator, said one code expression is expanded as the list size associated with said one unique iterator; or
- where said software code expression contains more than one unique iterator, said one code expression is expanded as the cross product of the list sizes associated with each unique iterator;

wherein the cross product is defined according to the relationships between the skip and stride definitions of said iterators, if any, or as a full cross product otherwise.

4. The claim according to claim 3 wherein said list construct further comprises an expansion list construct and or an explicit list construct.

5. A program storage device readable by a computer that tangibly embodies a program of instructions executable by the computer to perform a method to use an expansion syntax for semiconductor design software that allows a single complex software code expression that represents multiple logic gates to be expanded into one or more simple software code expressions that individually represent a single logic gate, comprising:

embedding a list construct within a software code expression wherein said list construct includes an expansion syntax indicator comprising a pair of brackets enclosing a plurality of list parameters wherein said list parameters identify list members and wherein said list members comprise ordered integers within the range of integers identified by a start integer, an end integer, and optionally a count integer, a step integer and or a skip integer to indicate a count of integers to step or skip during expansion, wherein said list construct further comprises one or more iterators used as an operator acting upon a parameter list to expand the list members, and wherein the list is grouped as a default list name or a explicit list name interpreting said list construct within said software code expression according to one of said iterator and said list member expansion syntax using an expansion function; and expanding using said expansion function said list construct within said software code expression to create a set of expanded expressions, said expanding further comprising:
- where one of said software code expressions contains only one unique iterator, said one code expression is expanded as the list size associated with said one unique iterator; or
- where said software code expression contains more than one unique iterator, said one code expression is expanded as the cross product of the list sizes associated with each unique iterator;

wherein the cross product is defined according to the relationships between the skip and stride definitions of said iterators, if any, or as a full cross product otherwise.

6. The claim according to claim 5 wherein said list construct further comprises an expansion list construct and or an explicit list construct.

* * * * *

UNITED STATES PATENT AND TRADEMARK OFFICE
CERTIFICATE OF CORRECTION

PATENT NO. : 7,299,461 B2
APPLICATION NO. : 10/738281
DATED : November 20, 2007
INVENTOR(S) : Fritz A. Boehm et al.

It is certified that error appears in the above-identified patent and that said Letters Patent is hereby corrected as shown below:

In column 5, line 59, delete "B" and insert -- is --, therefor.
In column 7, line 12, delete "(|15-0+1)/2" and insert -- (|15-0|+1)/2 --, therefor.
In column 7, line 14, delete "4g2" and insert -- 4h2 --, therefor.
In column 7, line 15, delete "4g2" and insert -- 4h2 --, therefor.
In column 7, line 16, delete "4g2" and insert -- 4h2 --, therefor.
In column 7, line 17, delete "4g2" and insert -- 4h2 --, therefor.
In column 7, line 18, delete "4g2" and insert -- 4h2 --, therefor.
In column 7, line 19, delete "4g2" and insert -- 4h2 --, therefor.
In column 7, line 20, delete "4g2" and insert -- 4h2 --, therefor.
In column 7, line 21, delete "4g2" and insert -- 4h2 --, therefor.
In column 7, line 31, delete "a" and insert -- an --, therefor.
In column 7, line 35, delete "4g2" and insert -- 4h2 --, therefor.
In column 7, line 36, delete "4g2" and insert -- 4h2 --, therefor.
In column 7, line 37, delete "4g2" and insert -- 4h2 --, therefor.
In column 7, line 38, delete "4g2" and insert -- 4h2 --, therefor.
In column 8, line 48, delete "nonwhite" and insert -- non-white --, therefor.
In column 9, line 19, after "parameters)" insert -- : --.
In column 9, line 36, delete "mathmatics:" and insert -- mathematics: --, therefor.
In column 11, line 20, delete "4g4" and insert -- 4h4 --, therefor.
In column 11, line 21, delete "4g3;" and insert -- 4h3; --, therefor.
In column 12, line 1, delete "4h[4:1" and insert -- 4h[4:1] --, therefor.
In column 12, line 33, after "below" insert -- : --.
In column 12, line 38, delete "B1:0]" and insert -- B[1:0] --, therefor.
In column 14, line 22, delete "nonwhite" and insert -- non-white --, therefor.
In column 14, line 57, in Claim 1, delete "and or" and insert -- and/or --, therefor.
In column 15, lines 18-19, in Claim 2, delete "and or" and insert -- and/or --, therefor.
In column 15, line 32, in Claim 3, delete "and or" and insert -- and/or --, therefor.
In column 16, lines 6-7, in Claim 4, delete "and or" and insert -- and/or --, therefor.

UNITED STATES PATENT AND TRADEMARK OFFICE
CERTIFICATE OF CORRECTION

PATENT NO.        : 7,299,461 B2
APPLICATION NO.   : 10/738281
DATED             : November 20, 2007
INVENTOR(S)       : Fritz A. Boehm et al.

It is certified that error appears in the above-identified patent and that said Letters Patent is hereby corrected as shown below:

In column 16, line 23, in Claim 5, delete "and or" and insert -- and/or --, therefor.
In column 16, line 29, in Claim 5, after "name" insert -- ; --.
In column 16, lines 51-52, in Claim 6, delete "and or" and insert -- and/or --, therefor.

Signed and Sealed this

Eighth Day of July, 2008

JON W. DUDAS
*Director of the United States Patent and Trademark Office*